(12) United States Patent
Zhang et al.

(10) Patent No.: US 9,565,581 B2
(45) Date of Patent: Feb. 7, 2017

(54) ITERATIVE DETECTION-DECODING SYSTEM

(71) Applicant: The Regents of the University of Michigan, Ann Arbor, MI (US)

(72) Inventors: Zhengya Zhang, Ann Arbor, MI (US); Chia-Hsiang Chen, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 15/049,031

(22) Filed: Feb. 20, 2016

(65) Prior Publication Data

US 2016/0249234 A1    Aug. 25, 2016

Related U.S. Application Data

(60) Provisional application No. 62/119,232, filed on Feb. 22, 2015.

(51) Int. Cl.
*H04L 1/00* (2006.01)
*H04W 24/02* (2009.01)
*H04W 72/08* (2009.01)
*H04B 7/04* (2006.01)

(52) U.S. Cl.
CPC ........... *H04W 24/02* (2013.01); *H04B 7/0452* (2013.01); *H04L 1/005* (2013.01); *H04L 1/0048* (2013.01); *H04W 72/082* (2013.01)

(58) Field of Classification Search
CPC ...... H04L 1/005; H04L 1/0048; H04L 1/0047; H04L 1/0045; H04L 1/0036; H04L 27/38; H04W 24/02; H04W 72/082; H04B 7/0452

USPC ........ 375/262, 267, 340, 341; 714/746, 752, 714/758

See application file for complete search history.

(56) References Cited

U.S. PATENT DOCUMENTS

| | | | | |
|---|---|---|---|---|
| 7,734,990 B2 * | 6/2010 | Maru | .................. | H03M 13/258 714/780 |
| 7,751,506 B2 * | 7/2010 | Niu | .................... | H03M 13/1102 375/262 |
| 8,433,968 B2 * | 4/2013 | Gotman | ................ | H04L 1/1845 714/751 |
| 9,363,036 B1 * | 6/2016 | Zhang | .................. | H04L 1/0009 |
| 2009/0323866 A1 * | 12/2009 | Bui | ........................ | H04L 25/067 375/340 |
| 2010/0074319 A1 * | 3/2010 | Tseng | ................. | H03M 13/1105 375/232 |

* cited by examiner

*Primary Examiner* — Betsy Deppe
(74) *Attorney, Agent, or Firm* — Reising Ethington P.C.

(57) ABSTRACT

A nonbinary iterative detector-decoder (IDD) system. The IDD system comprises a detector, a decoder; and a nonbinary interface electrically connected between the detector and decoder. The interface is operative to convert a soft symbol and variance that is output by the detector into a corresponding nonbinary log likelihood ratio (LLR) vector that comprises one or more nonbinary LLRs, and to provide the LLR vector to the decoder. The interface is further configured to convert a nonbinary LLR vector comprised of one or more nonbinary LLRs that is output by the decoder into a corresponding soft symbol and variance, and to provide the soft symbol and variance to the detector.

24 Claims, 5 Drawing Sheets

| Constellation Symbol | LLR |
| --- | --- |
| $x_1$ | 0 |
| $x_2$ | $(1 - d_{x1}) \times 4$ |
| $x_3$ | $(1 + d_{x1}) \times 4$ |
| $x_4$ | $(2 - d_{x1}) \times 8$ |
| $y_1$ | 0 |
| $y_2$ | $(1 - d_{y1}) \times 4$ |
| $y_3$ | $(1 + d_{y1}) \times 4$ |
| $y_4$ | $(2 - d_{y1}) \times 8$ |

ITERATIVE DETECTION-DECODING SYSTEM

CROSS-REFERENCE TO RELATED APPLICATION

This application claims the benefit of U.S. Provisional Application No. 62/119,232 filed Feb. 22, 2015, the entire contents of which are hereby incorporated by reference.

GOVERNMENT LICENSE RIGHTS

This invention was made with government support under CCF-1054270 awards by the National Science Foundation. The Government has certain rights in the invention.

TECHNICAL FIELD

The present disclosure relates generally to iterative detection-decoding systems, and more particularly, to nonbinary iterative detection-decoding systems having a detector, a decoder, and a nonbinary interface electrically connected therebetween.

BACKGROUND

It is common in many types of wireless communications (e.g., Wi-Fi, long term evolution (LTE), evolved high speed packet access (HSPA+), WiMax, etc.) for multiple-input multiple-output (MIMO) wireless systems to be used to improve performance. With MIMO, multiple antennae are used at each end of the wireless link to spatially multiplex data streams.

MIMO performance is improved by using an iterative detection-decoding (IDD) system to reduce the signal-to-noise ratio (SNR) required for a reliable transmission. An IDD system generally comprises a soft-in soft-out (SISO) detector and a SISO forward error correction (FEC) decoder. The detector is operable to cancel interference, and the decoder is operable to correct errors. Collectively, the detector and decoder exchange soft information in an iterative manner to improve SNR. Detectors used in known or conventional IDD systems include spherical detectors (SD) and minimum mean square error (MMSE) detectors, with MMSE detectors being less complex and easier to scale up to support high data rates and spectral efficiency. Decoders used in known or conventional IDD systems include binary low-density parity-check (LDPC) decoders.

In addition to the detector and decoder, the IDD system also includes an interface between the detector and decoder that is operative to convert the output of the detector (soft symbol and variance) to the input of the decoder (a priori log likelihood ratio (LLR)), and output of the decoder (a posteriori LLR) to the input of the detector (soft symbol and variance). This can be done in the binary domain or nonbinary domain, wherein in the binary domain, the conversion between symbol statistics and LLR is done on a bit-by-bit basis.

The use of nonbinary code, e.g., nonbinary LDPC, and a nonbinary decoder can provide better coding gain and improved detection-decoding performance as compared to binary code, e.g., binary LDPC, and a binary decoder. However, the bit-by-bit conversion between symbol statistics and nonbinary LLR using a conventional binary interface is inefficient.

Accordingly, there is a need for a nonbinary interface for use between a detector and decoder of an IDD system that minimizes and/or eliminates one or more of the above-identified deficiencies.

SUMMARY

According to one embodiment, there is provided a nonbinary iterative detector-decoder system. The system comprises a detector, a decoder, and a nonbinary interface electrically connected between the detector and decoder. The interface is operative to convert a soft symbol and variance that is output by the detector into a corresponding nonbinary log likelihood ratio (LLR) vector that comprises one or more nonbinary LLRs and to provide the LLR vector to the decoder. The interface is further configured to convert a nonbinary LLR vector comprised of one or more nonbinary LLRs that is output by the decoder into a corresponding soft symbol and variance and to provide the soft symbol and variance to the detector.

According to another embodiment, there is provided a nonbinary interface for use in an iterative detector-decoder system. The interface comprises an electronic processor and an electronic memory device electrically coupled to the processor and having instructions stored therein. The processor is configured to access the memory device and execute the instructions stored therein such that it is configured to convert a soft symbol and variance received from a detector into a corresponding nonbinary log likelihood ratio (LLR) vector that comprises one or more nonbinary LLRs, and to convert a nonbinary LLR vector that is received from a decoder and that comprises one or more nonbinary LLRs into a corresponding soft symbol and variance.

According to yet another embodiment, there is provided a method of operating an iterative detector-decoder system having a detector, decoder, and nonbinary interface electrically connected between the detector and decoder. The method comprises receiving from the detector and at the interface, a soft symbol and a variance of the soft symbol, converting the soft symbol and variance to a nonbinary log likelihood ratio (LLR) vector that comprises one or more nonbinary LLRs each of which corresponds to a respective symbol in a constellation of symbols, and inputting the LLR vector into the decoder. The method further comprises receiving from the decoder and at the interface, a nonbinary LLR vector that comprises one or more nonbinary LLRs each of which corresponds to a respective constellation symbol, converting the nonbinary LLR vector received from the decoder into a corresponding soft symbol and variance, and inputting the soft symbol and variance into the detector.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE ILLUSTRATED EMBODIMENTS

In accordance with one aspect of the present disclosure, a nonbinary IDD system having a detector, a decoder, and a nonbinary interface between the detector and decoder is provided. The interface is configured to receive from the detector, a soft symbol and variance of an electrical signal received by the detector, to convert the soft symbol and variance into a corresponding vector of one or more nonbinary log likelihood ratios (LLR) using a nearest neighbor algorithm, and to provide the nonbinary LLR vector to the decoder. The interface is further configured to receive from the decoder, a nonbinary LLR vector comprised of one or more nonbinary LLRs, to convert the nonbinary LLR vector into a corresponding soft symbol and variance, and to provide the soft symbol and variance to the detector. Among potentially other benefits/advantages, the interface is more scalable than conventional binary interfaces and may be efficiently implemented for a high-order modulation. For ease of description purposes, a nonbinary LLR will hereinafter be referred to simply as an LLR, and a nonbinary LLR vector will hereinafter be referred to simply as an LLR vector (i.e., without reference to either being nonbinary). Accordingly, unless otherwise indicated, an LLR described below is, in fact, a nonbinary LLR, and an LLR vector described below is, in fact, a nonbinary LLR vector.

Figure 1:
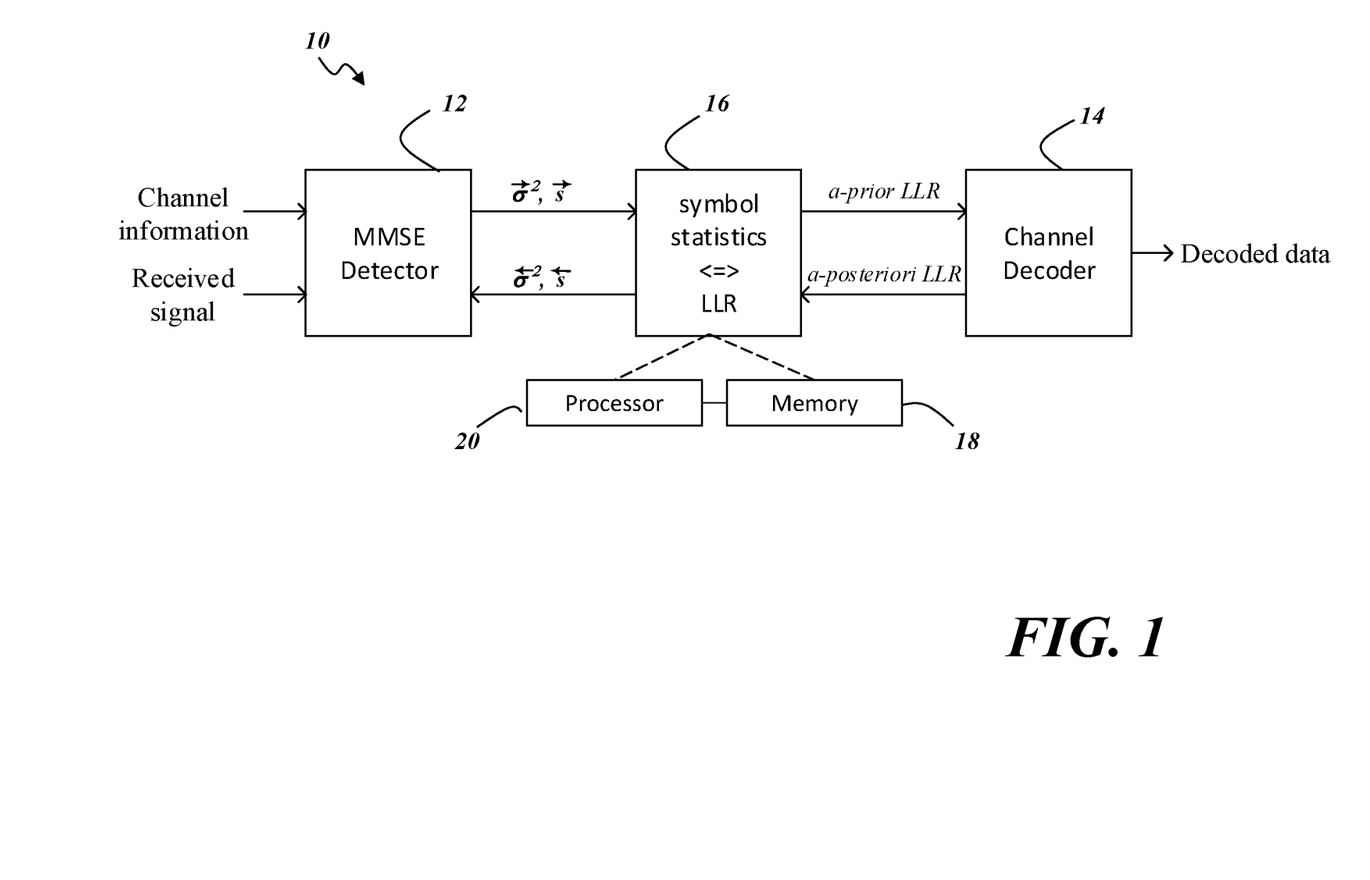
FIG. 1 is a schematic and block diagram of an illustrative embodiment of an iterative detection-decoding system.

FIG. 1 depicts an illustrative embodiment of a nonbinary IDD system 10. The IDD system 10 includes a detector 12, a decoder 14, and an interface 16 electrically connected between the detector 12 and decoder 14. As will be described in greater detail below, the interface 16 is configured to convert an output of the detector 12 (i.e., soft symbol ($\vec{s}$) and its variance ($\vec{\sigma}^2$)) to an input of the decoder 14 (i.e., LLR vector comprising one or more LLRs), and to convert an output of the decoder 14 (i.e., LLR vector comprising one or more LLRs) to an input of the detector 12 (i.e., soft symbol and its variance). The IDD system 10 may be implemented or embodied on a single chip (e.g., integrated circuit) alone or with other components or devices so as to form a "system-on-a-chip;" while in other embodiments, multiple chips (e.g., integrated circuits) may be utilized (e.g., one or more of the components of the IDD system 10 may be disposed or located on a different chip than one or more other components of the IDD system 10).

The functionality, construction and operation of both the detector and decoder of an IDD system are well known in the art, and as such, a detailed description will not be provided. To summarize, however, the detector 12 is configured to output a soft symbol of a received signal and the variance associated with that soft symbol. The soft symbol represents an estimated position in a particular signal constellation, and the variance represents the likelihood of the soft symbol. For purposes of illustration, the description below will be with respect to an embodiment wherein the signal constellation comprises a quadrature amplitude module (QAM) constellation. A QAM constellation can be translated into nonbinary Galois field (GF) symbols by mapping each point in the QAM constellation to a particular GF symbol hereinafter referred to as a constellation symbol or complex constellation symbol (S) having both an x-axis coordinate and an imaginary-axis (y-axis) coordinate. The number of constellation points in the QAM constellation is dictated by the number of bits of information in a symbol, or $2^n$ where n is the number of bits per symbol. In the example to be described below, the QAM constellation comprises a 256-point QAM constellation (or $2^8$), and thus, the number of bits per symbol is eight (8). It will be appreciated, however, that in other embodiments, constellations other than QAM constellations or QAMs having more or less than 256 points may also be used. In any event, a 256-QAM constellation comprises 256 constellation points, and thus, 256 constellation symbols that each correspond to a respective one of the constellation points. In an embodiment, the detector 12 is an electronic hardware component. In other embodiments, however, the detector 12 may be implemented in software that may be executed by an appropriately configured electronic processor, such as, for example, an electronic processor of the interface 16, or another component. Accordingly, the present disclosure is not intended to be limited to any particular implementation of the detector 12; rather any suitable implementation may be used. In an embodiment, however, the detector 12 comprises a MIMO detector, and more specifically, a MMSE detector; though other suitable detectors may also be used.

The decoder 14 is configured to perform an error correction function (forward error correction) as well as to provide a decoded output representative of the input signal received at the detector 12. In an embodiment, the decoder 14 is an electronic hardware component. In other embodiments, however, the decoder 14 may be implemented in software that may be executed by an appropriately configured electronic processor, such as, for example, an electronic processor of the interface 16, or another component. Accordingly, the present disclosure is not intended to be limited to any particular implementation of the decoder 14; rather any suitable implementation may be used. In an embodiment, however, the decoder 14 comprises a nonbinary decoder, and in an illustrative embodiment wherein the coding being used is nonbinary LDPC, a nonbinary LDPC decoder.

The interface 16 is electrically connected between the detector 12 and decoder 14, and comprises a nonbinary interface that, as briefly described above, is configured to convert a soft symbol and variance output by the detector 12 into a vector of one or more LLRs for input into the decoder 14, and to convert a vector of one or more LLRs output by the decoder 14 into a soft symbol and variance for input into the detector 12. The conversions performed by the interface 16 are part of an iterative process for cancelling interface/noise and correcting errors that is performed prior to decoded data being output by the decoder 14 in an effort to make the output of the decoder 14 as accurate as possible. Like conventional interfaces, the interface 16 comprises one or more electrical or electronic memory devices 18 for storing various data or information (e.g., algorithms, equations, scripts, software code, etc.), required to perform the conversions to be described below, and at least one electronic processors 20 that is configured to perform or implement the mathematical operations required for the conversion processes the interface 16 is configured to perform. In an embodiment, the memory 18 is electrically coupled to and is accessible by the processor 20 such that the processor 20 may access the information stored therein or thereon and use it to perform or implement the required mathematical operations described herein that the interface is configured to perform. In an embodiment, the processor 20 can be an electronic microprocessor with or without onboard memory. In any event, in an embodiment, the interface 16 may be implemented or embodied in a dedicated chip or integrated circuit that is separate and distinct from the detector 12 and/or decoder 14. In other embodiments, however, the interface 16 may be integrated into the same chip or integrated circuit as the detector 12 and decoder 14. Accordingly, the present disclosure is not intended to be limited to any particular architecture for the interface 16, or for the IDD system 10 as a whole, for that matter.

As briefly described above, the interface 16 is configured to convert a soft symbol and variance from the detector 12 into a vector of one or more LLRs for input to the decoder 14. As also described above, in an instance wherein a QAM constellation is used, the constellation comprises $2^n$ constellation symbols each corresponding to a constellation point in the $2^n$-QAM. In an embodiment, the conversion comprises computing for each of one or more constellation symbols in the constellation, a probability that the soft symbol received from the detector 12 corresponds to that constellation symbol. In an embodiment, this is done based on the Euclidean distance from the constellation symbol being evaluated to the soft symbol; the shorter the distance, the higher the probability. The probability is then converted to an LLR for that constellation symbol by dividing the probability associated with the symbol by the probability of a reference constellation symbol and then taking the natural logarithm of the quotient. Once an LLR has been determined for each of the one or more constellation symbols (which could include all $2^n$ symbols or a subset of one or more, but less than all, of the constellation symbols), an LLR vector is formed and used as the input to the decoder 14.

Figure 2:
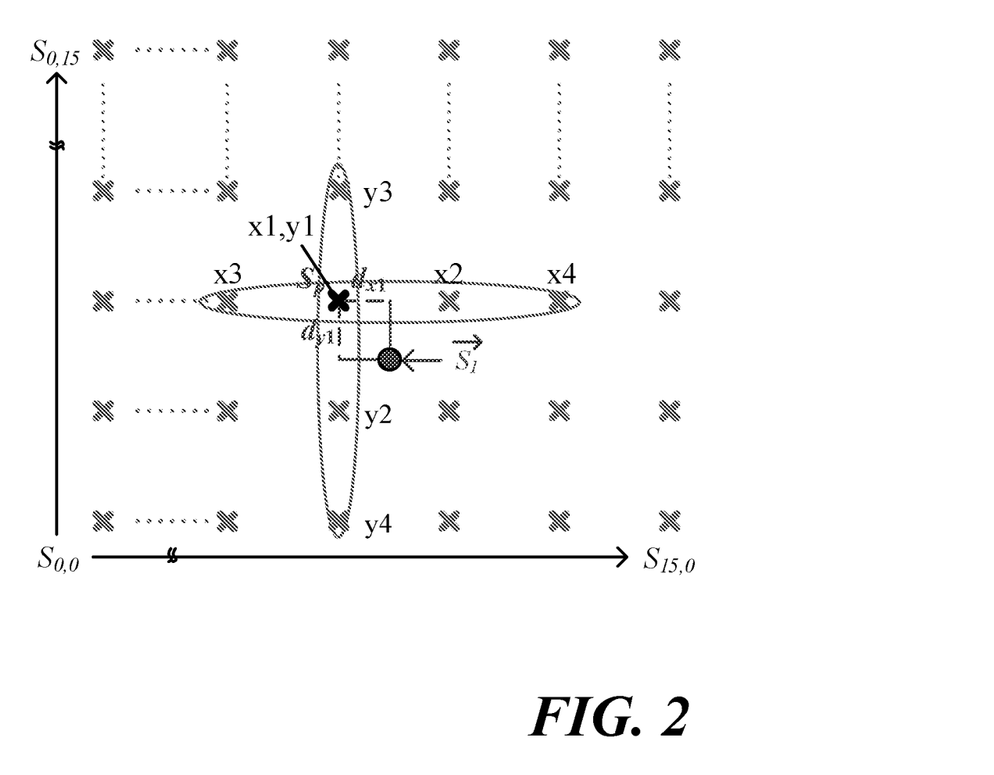
FIG. 2 is a depiction of a constellation of symbols that may be used by a component of an iterative detection-decoding system, for example, the system illustrated in FIG. 1, in the performance of one or more functions of the iterative detection-decoding system.

In an embodiment, the conversion described above is performed using a "nearest neighbor" technique. More specifically, and with reference to FIG. 2, the constellation symbol that is nearest to the soft symbol ($\vec{s}$), and thus, the most likely constellation symbol, is determined and named $S_p$. That symbol is then treated as the reference symbol whose probability is used to determine the LLRs of other symbols in the constellation as described above (i.e., the probability of a given constellation symbol is divided by the probability of constellation symbol $S_p$, and the LLR is computed as the natural logarithm of the quotient). Hence, the LLR for any constellation symbol in the constellation can be computed using the equation (1):

$$LLR_K^{(nb)} = \ln\left(\frac{P[\vec{s} = S_K \mid \vec{s}]}{P[\vec{s} = S_P \mid \vec{s}]}\right) = \frac{1}{\sigma^2}(|\vec{s} - S_K|^2 - |\vec{s} - S_P|^2); \quad (1)$$

where "nb" denotes that the LLR is a nonbinary LLR, and "K" represents the number ascribed to the particular constellation symbol being evaluated. Based on equation (1), the LLR of the nearest or most likely symbol Sp is $LLR_p^{(nb)}=0$, and the larger the LLR value of the other symbol(s), the lower the probability of the soft symbol corresponding to that or those symbols. Equation (1) can be decomposed into equation (2) by separating the real and imaginary axes:

$$LLR_K^{(nb)} = \ln\left(\frac{P[\vec{s} = S_K \mid \vec{s}]}{P[\vec{s} = S_P \mid \vec{s}]}\right) = \quad (2)$$

$$\ln\left(\frac{P[\vec{s}_{(x)} = S_{K_{(x)}} \mid \vec{s}]P[\vec{s}_{(y)} = S_{K_{(y)}} \mid \vec{s}]}{P[\vec{s}_{(x)} = S_{P_{(x)}} \mid \vec{s}]P[\vec{s}_{(y)} = S_{P_{(y)}} \mid \vec{s}]}\right)$$

$$= \frac{1}{\sigma^2}(|\vec{s}_{(x)} - S_{K_{(x)}}|^2 - |\vec{s}_{(x)} - S_{P_{(x)}}|^2) +$$

$$\frac{1}{\sigma^2}(|\vec{s}_{(y)} - S_{K_{(y)}}|^2 - |\vec{s}_{(y)} - S_{P_{(y)}}|^2),$$

where subscripts (x) and (y) indicate the real part and imaginary part, respectively.

To better illustrate, and by way of example only, FIG. 2 illustrates a portion of a 256-QAM having a soft symbol $\vec{S_1}$ and its nearest neighbor ($S_p$) marked thereon. In this example, the 16 most likely constellation points/symbols (i.e., $2^{n/2}$) are considered, and x- and y-axis projections of those symbols are shown in the constellation illustrated in FIG. 2 as $x_1$-$x_4$ and $y_1$-$y_4$. It will be appreciated, however, that in other embodiments, more or less symbols may be considered. In any event, the projection of the Euclidean distance from $\vec{S_1}$ to $S_p$ on the x-axis is $d_{x1}$, and the projection on the y-axis is $d_{y1}$. Assuming for purposes of illustration only that the spacing between constellation points is a value of 2, the distance from $\vec{S_1}$ to the second nearest constellation points/symbols along the x-axis and y-axis are $(2-d_{x1})$ and $(2-d_{y1})$, respectively. Therefore, using equation (2), the respective LLRs of the second nearest constellation symbols along the x-axis and y-axis are:

$$LLR_{x2}^{(nb)} = \frac{1}{\sigma^2}(|2 - d_{x1}|^2 - |d_{x1}|^2) = \frac{1}{\sigma^2}(4 - 4d_{x1}),$$

and $$LLR_{y2}^{(nb)} = \frac{1}{\sigma^2}(|2 - d_{y1}|^2 - |d_{y1}|^2) = \frac{1}{\sigma^2}(4 - 4d_{y1})$$

Figure 3:
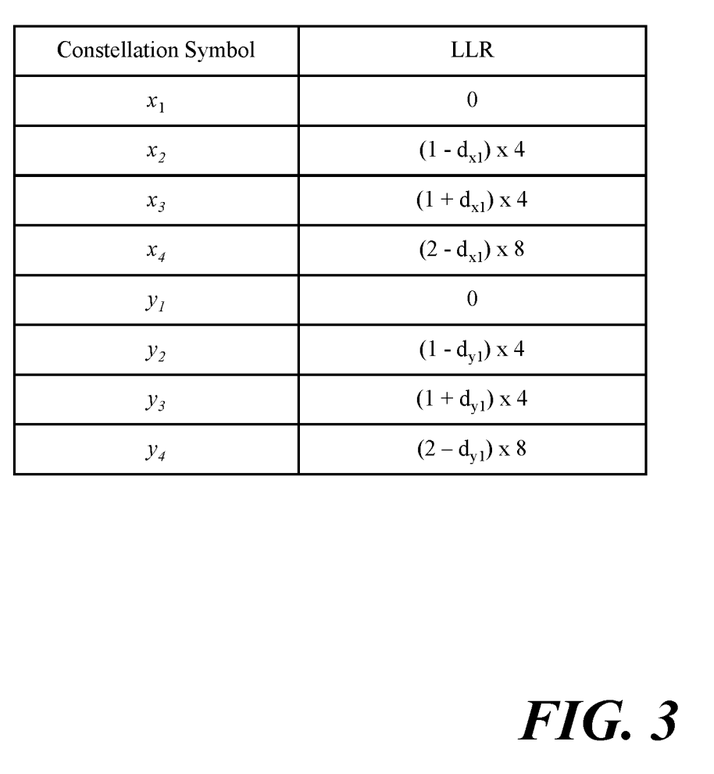
FIG. 3 is a table showing nonbinary log likelihood ratios (LLR) for a plurality of the constellation symbols in the constellation depicted in FIG. 2.

Notice that the square terms are eliminated, simplifying the LLR calculation. This technique can be extended to finding the LLRs of the rest of the constellation symbols being considered as shown in FIG. 3.

Since there are $2^{n/2}$ constellation symbols along one x-axis, and $2^{n/2}$ constellation symbols along one y-axis, the complexity of calculating symbol LLRs along the x- or y-axis is $O(2^{n/2})$. The real and imaginary parts need to be merged together, the complexity of which is proportional to the number of constellation symbols, i.e., $O(2^n)$. Accordingly, each of the "x" LLRs in FIG. 3 must be cross added with each of the "y" LLRs to find an LLR for each of the 16 constellation symbols. These 16 LLRs form an LLR vector within which the LLRs are sorted from most likely (nearest) constellation symbol to least likely (farthest) constellation symbol, and the vector is then input to the decoder.

The above described technique has numerous advantages compared to other conventional techniques, such as, for example, conventional bit-by-bit techniques, including, among others, better scaling and the use of addition without the need for multiplication, which is required in conventional bit-by-bit techniques.

Upon receipt of the LLR vector from the interface 16, and as is well-known in the art, the decoder 14 performs an error correction function based on code information stored therein. The decoder 14 then sends an LLR vector (comprised of one or more a posteriori LLRs) back to the interface 16. The interface 16 then converts the LLR vector to a soft symbol and corresponding variance using a direct conversion method. The soft symbol and variance are then input to the detector and the process may be repeated one or more times.

In an embodiment, the conversion process from an LLR vector to a soft symbol/variance comprises a two-step process. In a first step, each LLR in the vector is converted to a linear probability using equation (3):

$$P_K^{(symbol)} = \frac{\exp\left(\frac{1}{2}LLR_K^{(nb)}\right)}{\exp\left(\frac{1}{2}LLR_K^{(nb)}\right) + \exp\left(-\frac{1}{2}LLR_K^{(nb)}\right)}, \quad (3)$$

where, again, "nb" denotes that the LLR is a nonbinary LLR, and "K" represents the constellation symbol to which the LLR being evaluated corresponds.

In the second step, the soft symbol is estimated using equation (4):

$$\overleftarrow{s} = \Sigma_{K=1}^{2n} P_K^{(symbol)} \times S_K, \quad (4)$$

and the variance of the soft symbol estimated using equation (4) is estimated using equation (5):

$$\overleftarrow{\sigma}^2 = \Sigma_{K=1}^{2n} P_K^{(symbol)} \times (S_K - \overleftarrow{s})^2, \quad (5)$$

where "$S_K$" in equations (4) and (5) corresponds to the value of the x and y coordinates of the constellation symbol $S_K$ being evaluated.

By way of example, assume the LLR vector received from the decoder comprises two LLRs corresponding to the two most likely constellation symbols: symbol $S_1$ having the (x,y) coordinates (1,1); and symbol $S_2$ having the (x,y) coordinates (3,3). Assume further that the probability of each constellation symbol is 50%, or 0.50. Using equation (4), the soft symbol may be estimated by multiplying the probability for constellation symbol $S_1$ (0.50) and the x coordinate of the symbol $S_1$ (1) together, and multiplying the probability for constellation symbol $S_2$ (0.50) and the x coordinate of the symbol $S_2$ (3) together. The two products are then added together to get the x-axis coordinate of the soft symbol, which in this example would be 2 ((0.50×1)+(0.50×3)=2). Next, the probability for constellation symbol $S_1$ (0.50) and the y coordinate of the symbol $S_1$ (1) are multiplied together, and the probability for constellation symbol $S_2$ (0.50) and the y coordinate of the symbol $S_2$ (3) are multiplied together. The two products are added together to get the y-axis coordinate of the soft symbol, which in this example would be is 2 ((0.50×1)+(0.50×3)=2). Accordingly, the soft symbol may be estimated to be located at coordinates (2,2) of the signal constellation. Using equation (5), the variance of that soft symbol may then be estimated.

The two-step method or technique described above is simpler than conventional techniques, such as, for example, a conventional three-step bit LLR method known in the art, because it does not include a bit probability calculation, and the symbol probability is readily calculated. Additionally, the two-step direct conversion technique described above is more scalable and simpler to implement than bit LLR techniques applied to conventional binary LDPC forward error correction.

Figure 4:
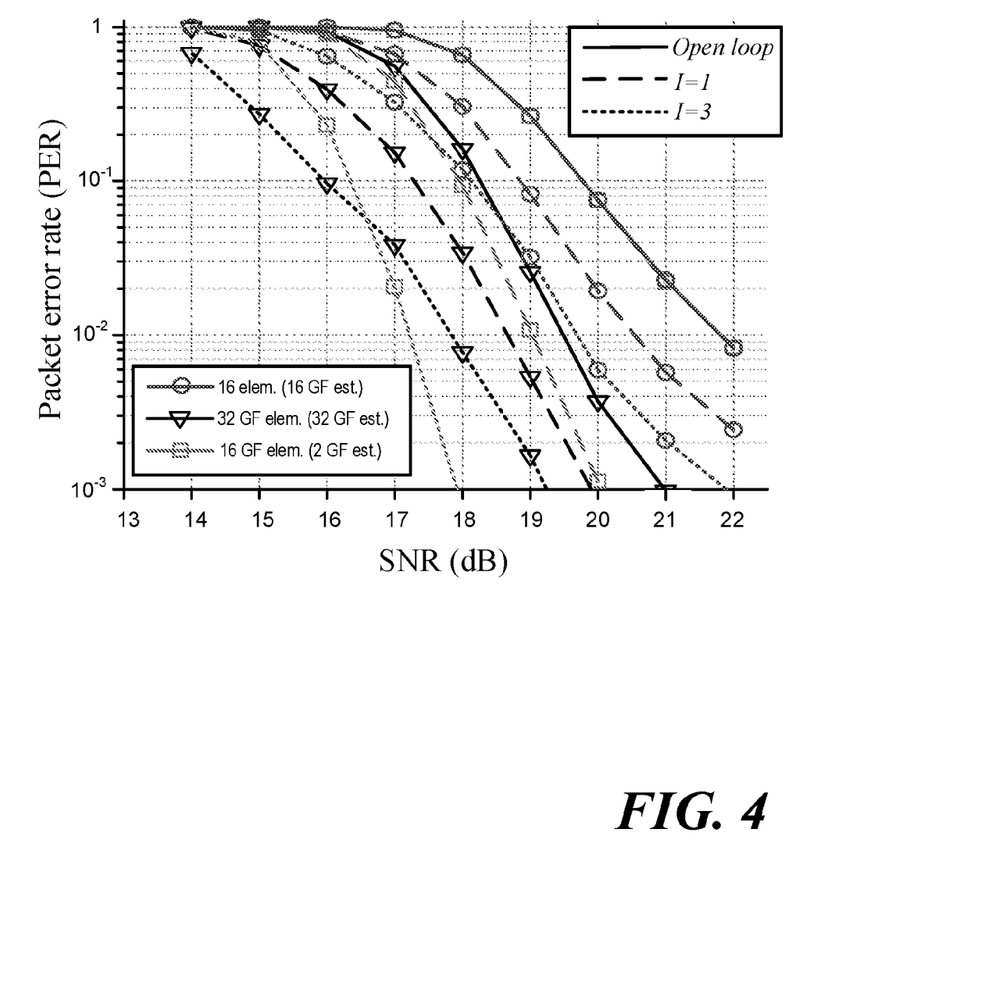
FIG. 4 is a chart depicting simulation/testing results performed for the iterative detection-decoding system illustrated in FIG. 1.

In embodiment, the two-step direct conversion method may be further simplified by using only the two (2) most likely constellation symbols to estimate the soft symbol and variance. Theoretically, it would be expected that using a small subset of the constellation symbols would worsen the accuracy of the soft symbol/variance estimation; experimentation and testing (i.e., computer model simulations), however, indicate that it is not necessary true. FIG. 4 illustrates the results of this experimentation/testing. More particularly, FIG. 4 depicts packet error rate of an IDD system using a GF(256) nonbinary LDPC code. Three (3) configurations used were: (1) using the 16 most likely constellation symbols in decoding and soft symbol estimation; (2) using the 32 most likely constellation symbols in decoding and soft symbol estimation; and (3) using the 16 most likely constellation symbols for decoding and the two (2) most likely constellation symbols for soft symbol estimation. Open loop and iterative results are shown (I represents the number of iterations). It was found during the experimentation/testing that if some iterations are used, e.g., more than 2, less constellation symbols provide better estimates, because additional constellation symbols introduce inaccuracies. Factors that contribute to this inaccuracy include numerical saturations in a fixed-point quantized nonbinary LDPC decoder and duplicate constellation symbols in the output of practical nonbinary LDPC decoders. Hence, it was found that using a small subset of the most reliable symbols may produce better soft symbol and variance estimates.

The direct conversion technique employing the two most likely constellation symbols is effectively an approximate direct conversion, and as with the direct conversion technique described above, also includes a first step of converting the LLR of each of the two most likely constellation symbols to linear probabilities $P_1$ and $P_2$ using equation (3) above. Assuming that the top two constellation symbols dominate the collection of LLRs, the probability of the second most likely symbol is $P_2=1-P_1$. The calculation can be further approximated as $P_2=\sim P_1$, where $\sim$ is a bit invert operator that inverts each bit of the binary bit string representing $P_1$. Similarly, $P_1=\sim P_2$.

The approximate direct conversion technique also includes a second step of estimating the soft symbol and associated variance based in part on the probabilities of the two most likely symbols using equations (4) and (5), where equation (4) may be simplified to:

$$\overleftarrow{s} \cong P_1 \times S_1 + P_2 \times S_2 = \sim P_2 \times S_1 + P_2 \times S_2, \text{ and}$$

equation (5) may be simplified as follows:

$$\begin{aligned}\overleftarrow{\sigma}^2 &\cong P_1(S_1 - \overleftarrow{s})^2 + P_2(S_2 - \overleftarrow{s})^2 \\ &= P_1(S_1 - P_1 \times S_1 - P_2 \times S_2)^2 + P_2(S_2 - P_1 \times S_1 - P_2 \times S_2)^2 \\ &= P_1 P_2 \times (S_1 - S_2)^2 \\ &= \sim P_2 \times P_2 \times (S_1 - S_2)^2\end{aligned}$$

The approximate direct conversion technique wherein only the two most likely constellation symbols are used may underestimate the symbol variance, especially when the signal-to-noise ratio (SNR) is low. Accordingly, in an embodiment, an offset term may be added to the equation above as a correction in the estimation calculation. Thus, equation (5) becomes:

$$\overleftarrow{\sigma}^2 \approx (1-P_2) \times P_2 \times (S_1 - S_2)^2 + P_2 \times q,$$

where q is the offset term and is dependent upon the size of the constellation.

Figure 5:
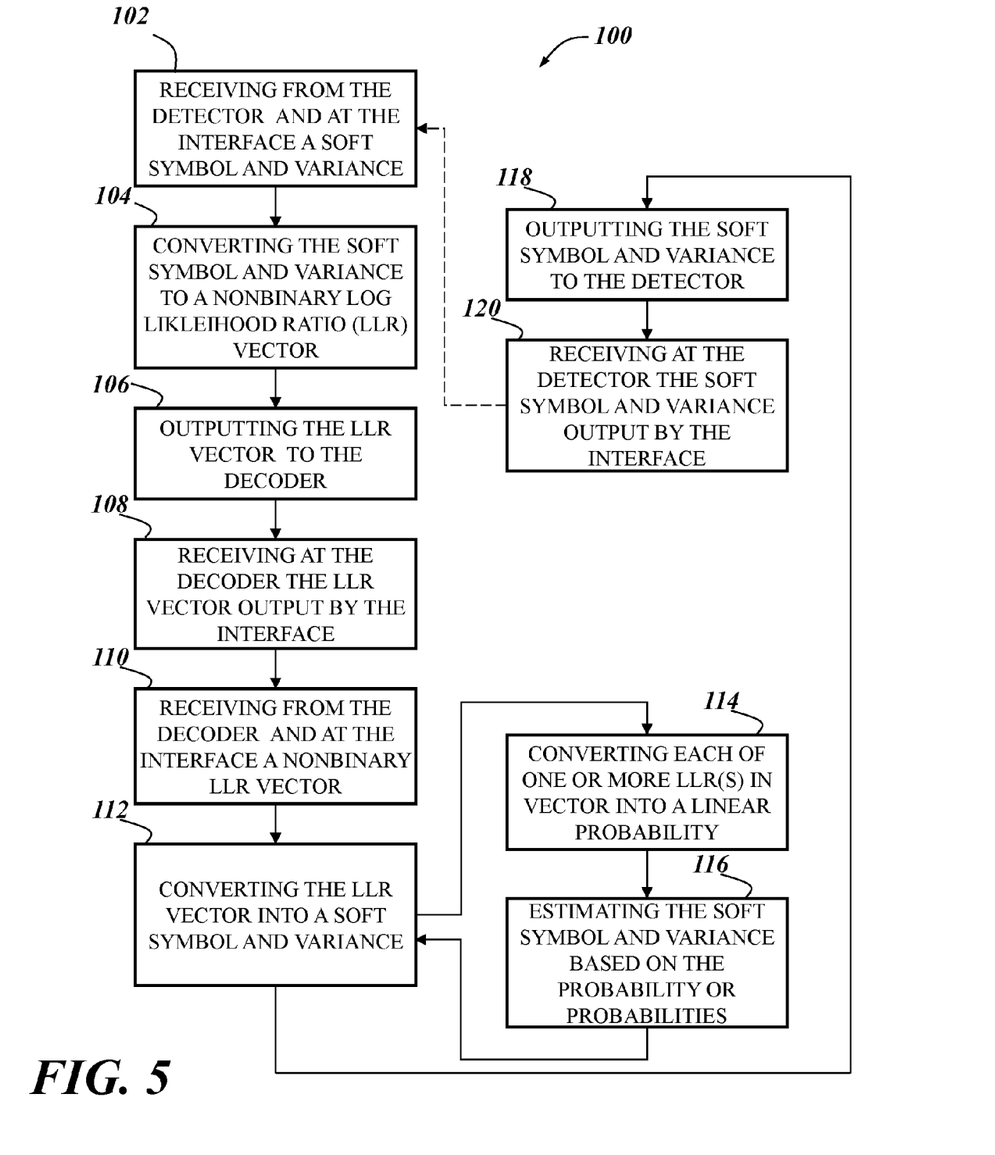
FIG. 5 is a flow diagram depicting various steps of an illustrative embodiment of a method for operating an iterative detection-decoding system, such as, for example, the iterative detection-decoding system illustrated in FIG. 1.

With reference to FIG. 5, it will be appreciated that in addition to the structure of the IDD system 10 or the individual components thereof, another aspect of the instant disclosure is a method 100 of operating an IDD system having a detector, a decoder, and a nonbinary interface electrically connected therebetween. It will be further appreciated that the methodology performed and carried out by the IDD system 10 and described in detail above applies to this aspect of the disclosure with equal force, and therefore, it will not be repeated in its entirety, rather a summary of the methodology will be provided. It will be still further appreciated that while method 100 may be described below in the context of IDD system 10, the application of method 100 is not meant to be so limited, but rather method 100 may find application with IDD systems, or components thereof, other than that illustrated in FIG. 1. Additionally, unless otherwise noted, the performance of method 100 is not meant to be limited to any one particular order or sequence of steps or to any particular component(s) for performing the steps.

In an embodiment, method 100 comprises a step 102 of receiving from the detector 12 and at the interface 16, a soft symbol corresponding to a received signal and a variance of that soft symbol. Method 100 further includes a step 104 of converting the received soft symbol and variance into a nonbinary LLR vector that comprises one or more nonbinary LLRs corresponding to one or more respective constellation symbols; and in an embodiment, a plurality of LLRs, one for each constellation symbol. Method 100 still further includes a step 106 of outputting the LLR vector to the decoder 14 where it is received as an input in a step 108.

Method 100 further includes a step 110 of receiving from the decoder 14 and at the interface 16, a nonbinary LLR vector that comprises one or more nonbinary LLRs corresponding to one or more respective constellation symbols. Method 100 further comprises a step 112 of converting the received LLR vector into a corresponding soft symbol and variance. In an embodiment, step 112 comprises a substep 114 of converting each of one or more of the LLRs in the LLR vector into a linear probability for the constellation symbol corresponding to that LLR, and a substep 116 of estimating the soft symbol and variance based at least in part on the linear probability or probabilities determined in substep 114. Method 100 still further includes a step 118 of outputting the estimated soft symbol and variance to the detector 12 where it is received as an input in a step 120. In an embodiment, the process may then be repeated iteratively any number of times, as is shown in FIG. 5.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Further, the term "electrically connected" and the variations thereof is intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A nonbinary iterative detector-decoder system, comprising:
    a detector;
    a decoder; and
    a nonbinary interface electrically connected between the detector and decoder, wherein the interface is operative to convert a soft symbol and variance that is output by the detector into a corresponding nonbinary log likelihood ratio (LLR) vector that comprises one or more nonbinary LLRs and to provide the LLR vector to the decoder, and to convert a nonbinary LLR vector comprised of one or more nonbinary LLRs that is output by the decoder into a corresponding soft symbol and variance and to provide the soft symbol and variance to the detector.

2. The system of claim 1, wherein the detector comprises one of:
    a soft-in soft-out detector (SISO) detector;
    a minimum mean square error (MMSE) detector; and
    a multiple-input multiple-output (MIMO) detector.

3. The system of claim 1, wherein the decoder comprises one of:
    a SISO decoder of a nonbinary code; and
    a nonbinary low-density parity-check (LPDC) decoder.

4. The system of claim 1, wherein the interface is configured to convert the soft symbol and variance into an LLR vector by:
    computing for each of one or more symbols in a constellation of symbols, a probability that the soft symbol corresponds to that constellation symbol;
    converting the probability associated with each of the one or more constellation symbols into a respective LLR for that constellation symbol; and
    forming the LLR vector from the LLRs corresponding to the one or more symbols in the constellation.

5. The system of claim 4, wherein the one or more symbols in the constellation of symbols comprises a plurality of symbols but less than all of the symbols in the constellation of symbols.

6. The system of claim 4, wherein the interface is configured to convert the probability associated with a particular constellation symbol into an LLR for that constellation symbol by dividing the probability by a probability of a reference constellation symbol and taking the natural logarithm of the quotient.

7. The system of claim 6, wherein the reference constellation symbol comprises the constellation symbol nearest the soft symbol in the constellation of symbols.

8. The system of claim 1, wherein the interface is configured to convert the nonbinary LLR vector into a corresponding soft symbol and variance by:
    converting each of one or more of the LLRs in the LLR vector into a linear probability for the constellation symbol corresponding to that LLR; and
    estimating the soft symbol and variance based at least in part on the linear probability or probabilities.

9. The system of claim 8, wherein the interface is configured to estimate the soft symbol and variance based at least in part on the linear probabilities of the two most likely constellation symbols.

10. A nonbinary interface for use in an iterative detector-decoder system, comprising:

an electronic processor; and an electronic memory device electrically coupled to the processor and having instructions stored therein;

wherein the processor is configured to access the memory device and execute the instructions stored therein such that it is configured to convert a soft symbol and variance received from a detector into a corresponding nonbinary log likelihood ratio (LLR) vector that comprises one or more nonbinary LLRs, and to convert a nonbinary LLR vector that is received from a decoder and that comprises one or more nonbinary LLRs into a corresponding soft symbol and variance.

11. The system of claim 10, wherein the interface is configured to convert the soft symbol and variance into an LLR vector by:

computing for each of one or more symbols in a constellation of symbols, a probability that the soft symbol corresponds to that constellation symbol;

converting the probability associated with each of the one or more constellation symbols into a respective LLR for that constellation symbol; and forming the LLR vector from the LLRs corresponding to the one or more symbols in the constellation.

12. The system of claim 11, wherein the one or more symbols in the constellation of symbols comprises a plurality of symbols but less than all of the symbols in the constellation of symbols.

13. The system of claim 11, wherein the interface is configured to convert the probability associated with a particular constellation symbol into an LLR for that constellation symbol by dividing the probability by a probability of a reference constellation symbol and taking the natural logarithm of the quotient.

14. The system of claim 13, wherein the reference constellation symbol comprises the constellation symbol nearest the soft symbol in the constellation of symbols.

15. The system of claim 10, wherein the interface is configured to convert the nonbinary LLR vector into a corresponding soft symbol and variance by:

converting each of one or more of the LLRs in the LLR vector into a linear probability for the constellation symbol corresponding to that LLR; and estimating the soft symbol and variance based at least in part on the linear probability or probabilities.

16. The system of claim 15, wherein the interface is configured to estimate the soft symbol and variance based at least in part on the linear probabilities of the two most likely constellation symbols.

17. A method of operating an iterative detector-decoder system having a detector, decoder, and nonbinary interface electrically connected between the detector and decoder, comprising:

receiving from the detector and at the interface, a soft symbol and a variance of the soft symbol;

converting the soft symbol and variance to a nonbinary log likelihood ratio (LLR) vector that comprises one or more nonbinary LLRs each of which corresponds to a respective symbol in a constellation of symbols;

inputting the LLR vector into the decoder;

receiving from the decoder and at the interface, a nonbinary LLR vector that comprises one or more nonbinary LLRs each of which corresponds to a respective constellation symbol;

converting the nonbinary LLR vector received from the decoder into a corresponding soft symbol and variance; and inputting the soft symbol and variance into the detector.

18. The method of claim 17, wherein the converting of the LLR vector into the soft symbol and variance comprises:

converting each of one or more of the LLRs of the LLR vector into a linear probability for the constellation symbol corresponding to that LLR; and estimating the soft symbol and variance based at least in part on the linear probability or probabilities.

19. The method of claim 17, wherein converting the soft symbol and variance to the LLR vector comprises:

computing for each of one or more symbols in a constellation of symbols, a probability that the soft symbol corresponds to that constellation symbol;

converting the probability associated with each of the one or more constellation symbols into a respective LLR for that constellation symbol; and forming the LLR vector from the LLRs corresponding to the one or more symbols in the constellation.

20. The method of claim 19, wherein the one or more symbols in the constellation of symbols comprises a plurality of symbols in the constellation of symbols, but less than all of the symbols in the constellation of symbols.

21. The method of claim 19, wherein converting the probability associated with a particular constellation symbol into an LLR for that constellation symbol comprises dividing the probability by a probability of a reference constellation symbol and taking the natural logarithm of the quotient.

22. The method of claim 21, wherein the reference constellation symbol comprises the constellation symbol nearest to the soft symbol in the constellation of symbols.

23. The method of claim 17, wherein converting the LLR vector into the soft symbol and variance comprises:

converting each of one or more of the LLRs in the LLR vector into a linear probability for the constellation symbol corresponding to that LLR; and estimating the soft symbol and variance based at least in part on the linear probability or probabilities.

24. The system of claim 23, wherein the interface is configured to estimate the soft symbol and variance based at least in part on the linear probabilities of the two most likely constellation symbols.

* * * * *